Sept. 25, 1923.

J. LONG

VALVE CAP

Filed Jan. 30, 1922

1,468,821

INVENTOR.
John Long

BY
Hardway Cathey
ATTORNEYS.

Patented Sept. 25, 1923.

1,468,821

UNITED STATES PATENT OFFICE.

JOHN LONG, OF VICTORIA, TEXAS.

VALVE CAP.

Application filed January 30, 1922. Serial No. 532,635.

*To all whom it may concern:*

Be it known that I, JOHN LONG, citizen of the United States, residing at Victoria, in the county of Victoria and State of Texas, have invented certain new and useful Improvement in a Valve Cap, of which the following is a specification.

This invention relates to new and useful improvements in a valve cap.

One object of the invention is to provide a cap adapted to be screwed over the valve stem of an inner tube of a pneumatic tire and designed for the purpose of protecting said tube, and the valve therein.

Another object of the invention is to provide a valve cap, whose enclosed end is hinged to the body of the cap so that the cap may be opened, to render the outer end of the tube accessible, for inflating or deflating the tire, and when closed will protect the tube and the valve therein.

With the above and other objects in view the invention has particular relation to certain novel features of construction, operation and arrangement of parts, an example of which is given in this specification and illustrated in the accompanying drawings, wherein :—

Figure 2:
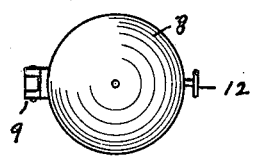
Figure 1:
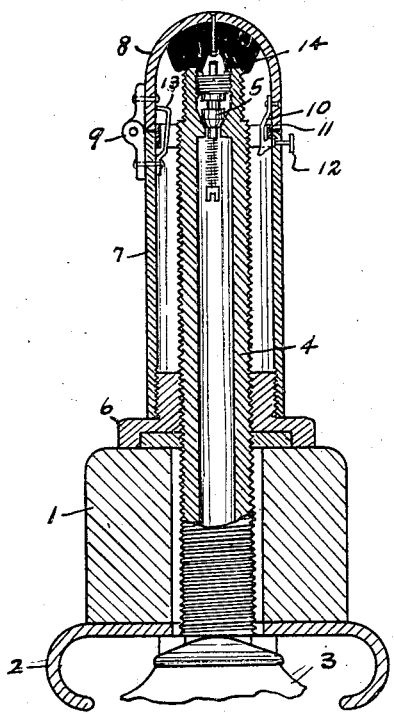

Figure 1 is a sectional view of a wheel rim showing the valve tube and the cap in section, and Figure 2 is an outer end view of the cap.

Referring now more particularly to the drawings, the numeral 1 designates the wheel felly, the numeral 2 is the tire rim of said felly, and the numeral 3 is the inner tube of the tire. This inner tube has the metallic valve tube 4 of the usual form which extends out through the felly in the usual way and which is provided with the valve 5. A bushing 6 is threaded onto the tube 4 against the felly and the valve cap is fitted over the tube 4 and screwed onto said bushing, in the usual way. This cap is composed of the cylindrical section 7 and the cap like covering 8 which encloses the outer end thereof and is hinged thereto by means of the hinge 9. Opposite the hinge there is a spring dog 10 which is fastened to the covering 8 and which is adapted to engage with the ring 11, which is pressed in the outer end of the section 7 to hold the cap like covering 8 in closed position. The spring dog may be released through the instrumentality of a push button 12 which operates through a bearing in the wall of the section 7, and against the free end of the spring dog 10. When this dog is released a pressure spring 13 opens the covering 8. This pressure spring is secured at one end to the section 7 and its free end presses against the inner side of the covering 8.

The inside of the covering 8 has a thick rubber gasket fastened thereto which presses against the outer end of the valve tube 4, when the covering 8 is in closed position and effectually seals the outer end of said tube.

What I claim is:

1. A valve tube cap formed of sections hinged together, releasable means securing said sections in closed position and a pressure spring operating to automatically open the cap when said means are released.

2. A valve tube cap formed of a cylindrical section and a cap like covering hinged to one end thereof, a releasable dog internally secured to said cap normally holding said covering in closed position and a yieldable member automatically opening the covering when said means are released.

3. A valve tube cap formed of a cylindrical section and a cap like cover hinged to one end thereof, a ring in the upper end of said cylindrical section, a releasable dog internally secured to said cap and adapted to engage over said ring, a push button for releasing said dog and a pressure spring for opening said cap.

4. A valve tube cap formed of a cylindrical section and a cap like covering hinged to one end thereof, a ring in the upper end of said cylindrical section, a releasable dog internally secured to said cap adapted to engage over said ring, a push button for releasing said dog, a pressure spring for opening said cap, and a rubber gasket in the upper end of said cap adapted to surround the upper end of said tube when said cap is in closed position.

In testimony whereof I have signed my name to this specification in the presence of two subscribing witnesses.

JOHN LONG.

Witnesses:
J. GUADER JOHNSTON,
ANDREW J. HICKEY.